J. H. ELWARD.
Mole-Plow.
No. { 33, 1,138 }
Reissued Feb. 19, 1861
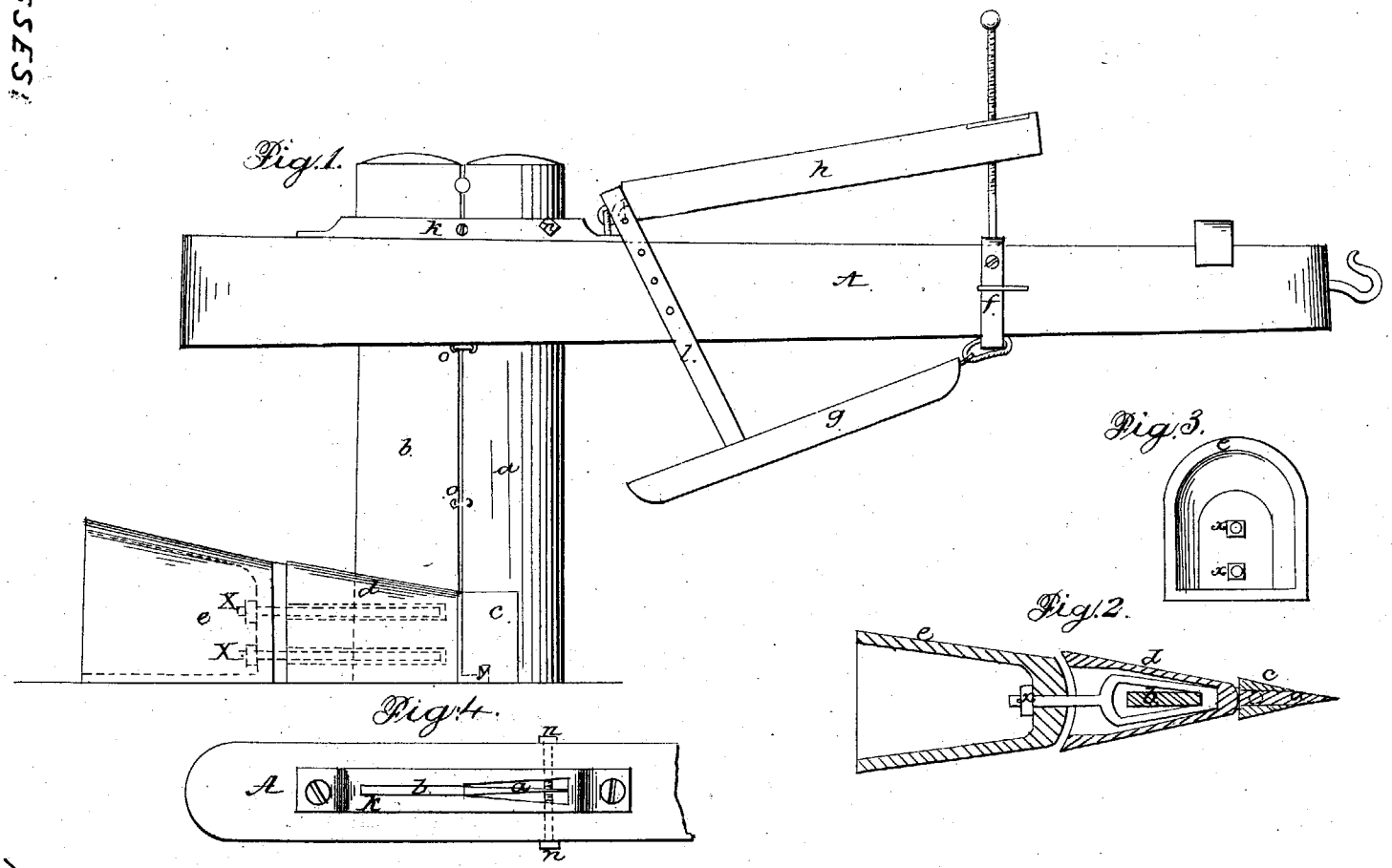
WITNESSES:
Octavius Knight
Z. C. Robbins
INVENTOR
John H. Elward
By O. S. Pierce
his atty.
N. PETERS, PHOTO-LITHOGRAPHER, WASHINGTON, D. C.

UNITED STATES PATENT OFFICE.

MARTIN A. HOWELL, JR., OF OTTAWA, ILLINOIS, ASSIGNEE OF JOHN H. ELWARD.

IMPROVEMENT IN MOLE-PLOWS.

Specification forming part of Letters Patent No. 30,625, dated November 13, 1860; Reissue No. 1,138, dated February 19, 1861.

*To all whom it may concern:*

Be it known that JOHN H. ELWARD, of Ottawa, in the county of La Salle and State of Illinois, did invent certain new and useful Improvements in Mole or Ditching Plows, (for which Letters Patent of the United States were issued to him bearing date the 13th day of November, A. D. 1860,) and that I, MARTIN A. HOWELL, Jr., the assignee of said ELWARD, do hereby declare that the following is a full, clear, and exact description thereof, reference being had to the accompanying drawings, making a part of this specification, and to the letters of reference thereon, of which—

Figure 1 represents a side elevation of a plan containing my improvements. Fig. 2 represents the shape of the moles of my plow. Fig. 3 represents the shape of the rear end of the mole which gives the shape to the drain. Fig. 4 represents a view of the rear end of the beam from the top, showing the relative position of the colters and the open slot through which they pass, which permits a lateral movement of the forward colter at its front edge.

The improvements consist in the use of means whereby underground drains or ditches can be made more perfect and durable, and whereby a more easy and uninterrupted flow of water is obtained, and swampy or low wet lands be thus drained and rendered arable.

Fig. 1 represents the general structure of the improved mole-plow, A being the beam thereof, with a slot through it to receive the colters *a* and *b*, which also pass through the metal plate *k*, which is made fast to the beam at a point on the top to correspond with the slot in the beam. The colters *a* and *b*, when used jointly, are linked together by links at *o o*, and held in a perpendicular position in the slot of the beam and plate by means of a pin, which passes through the plate *k*. The colter *b* is a stationary colter, and the colter *a* is so arranged that by means of set-screws *n n* the front edge of the colter *a* can be moved laterally in the open slot through which it passes, the shape of which slot corresponds with the line of lateral movement of the front edge of the said colter, which is clearly shown in Fig. 4.

Fig. 2 represents the shape of the moles at the bottom. Attached to the colter *a* is a sectional mole, *c*, which is permanently secured to this colter, and which serves to open or cut the passage in whatever line of movement the colter *a* may be fixed in its passage through the earth. The moles *d* and *e* have an upward-inclining top, ending in the form of an arch, while their bottoms necessarily preserve a straight line, so that in their passage through the earth the earth is pressed upward and at the sides, leaving the floor of the drain but slightly compressed. The mole *e* is hinged to the mole *d*, which renders it flexible as to lateral movement only, that it may conform to the side movement of the colter *a* and sectional mole *c* and assume a position corresponding to the radius of the required curve which the position of the colter *a* by a change of position laterally may produce.

Upon the beam A is a band, *f*, to which is fastened an iron hook upon either side, to which the draft-rope is often attached in case a side draft is necessary, and across the front end of the beam A is fixed a transverse piece, arranged with notches at various points. Upon the end of the beam A is a hook, to which the rope is attached when a straight draft is required.

A hole being dug in the earth, and the colters with moles attached being placed therein, the plow is drawn forward by means of a rope, to which power is applied by a capstan, which is placed at a point somewhat distant from the plow. Now, as the plow is drawn forward, it is often necessary to turn the plow to the right or left, in order to avoid rocks or other obstructions, as also great inequalities in the surface. Therefore the plow is stopped, the rope slackened and fastened to one of the hooks upon the side of the beam, and passed through one of the notches in the transverse piece across the front of the beam. The front edge of the colter *a* is then moved laterally at its front edge by means of the screws *n n*, the extent of which movement is dependent upon the radius of the required curve. When fixed at the desired point the power is applied by the capstan and the line of draft thus changes the direction and line of movement of the beam, while the changed position of the forward colter, thus corresponding, forms a curve in its passage through the earth until the side draft is spent, which then requires the movement of the capstan.

It is obvious that without a colter the front edge of which may be moved laterally, every deviation from a straight line by the application of a side draft would result in the production of an angle, which would check and disturb the easy flow of the water, which would wear away the drain at the angles and eventually destroy it.

The nature of my invention consists principally in the use of means whereby the line of an underground drain or ditch can be more perfectly made, and its durability better secured by substituting a curve of any desired radius for angles which have been heretofore produced at points of deviation from the straight line of the ditch or drain.

I disclaim the use of a stationary colter having one or more moles attached for the purposes of forming an undergound drain or ditch, for such is well known and in common use; but

What I claim, and desire to secure by Letters Patent, is—

1. In combination with a plow or machine for purposes of underground draining, a stationary colter and a colter the front edge of which may be moved laterally, for the purposes and substantially as described.

2. The sections *e*, *d*, and *c* of the mole, in combination with the colters *a* and *b*, when arranged as and for the purposes set forth, substantially as described.

3. The movable colter *a*, in combination with the side draft as applied at the link or loop at *f* on the side of the beam A through either of the slots in the transverse piece upon the forward end of the beam A, for the purposes substantially as set forth and described.

MARTIN A. HOWELL.

Witnesses:
O. S. X. PECK,
J. S. BALL.